(12) United States Patent
Li et al.

(10) Patent No.: US 10,378,857 B2
(45) Date of Patent: *Aug. 13, 2019

(54) AUTOMATIC DEVIATION CORRECTION METHOD

(71) Applicant: Huntercraft Limited, Albany, NY (US)

(72) Inventors: Danyang Li, Albany, NY (US); Ming Chen, Albany, NY (US); Yayun Gong, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/825,537

(22) Filed: Nov. 29, 2017

(65) Prior Publication Data

US 2019/0162508 A1 May 30, 2019

(51) Int. Cl.
*F41G 1/54* (2006.01)
*F41A 23/16* (2006.01)
*F41G 3/00* (2006.01)
*F41G 3/06* (2006.01)
*F41G 3/32* (2006.01)

(52) U.S. Cl.
CPC .............. *F41G 1/545* (2013.01); *F41A 23/16* (2013.01); *F41G 3/005* (2013.01); *F41G 3/06* (2013.01); *F41G 3/323* (2013.01)

(58) Field of Classification Search
None
See application file for complete search history.

(56) References Cited

U.S. PATENT DOCUMENTS

| | | | |
|---|---|---|---|
| 5,775,699 A * | 7/1998 | Orito | F41J 5/10 273/371 |
| 2011/0315767 A1* | 12/2011 | Lowrance | F41G 3/02 235/404 |
| 2016/0084617 A1* | 3/2016 | Lyren | F41G 3/08 42/135 |

* cited by examiner

*Primary Examiner* — Kristy A Haupt
(74) *Attorney, Agent, or Firm* — Dragon Sun Law Firm, PC; Jinggao Li, Esq.

(57) ABSTRACT

An automatic deviation correction method, which is applied to a shooting sighting telescope. The automatic deviation correction method includes the following steps: converting an optical image obtained by a shooting sighting telescope into an electronic image, extracting a target paper area from the electronic image, and performing pixel-level subtraction on the target paper area and an electronic reference target paper to detect points of impact, calculating a center point of each of the points of impact to obtain a deviation of the center point of each of the points of impact and a center point of the target paper area; and inputting the deviation into the shooting sighting telescope for automatically correcting subsequent shooting.

9 Claims, 7 Drawing Sheets

AUTOMATIC DEVIATION CORRECTION METHOD

TECHNICAL FIELD

The present invention belongs to the technical field of sighting, and particularly relates to an automatic deviation correction method.

BACKGROUND

Sights in the prior art includes a mechanical sight and an optical sight, and the mechanical sight mechanically realizes sighting by a metal sight, such as a ruler, a sight bead, and a peep sight; and the optical sight realizes sighting by overlapping a target image and a sighting line on the same focusing plane by using optical lens imaging. The existing sight has the following shortcomings and inconveniences: (1) after the sight is mounted, when the sight is applied to sighting shooting, it is ensured that accurate shooting may be completed by an accurate sighting gesture in combination with a long-term shooting experience, however, for a shooting beginner, his or her shooting accuracy will be influenced by an incorrect sighting gesture and a poor shooting experience; (2) in a shooting process, there is a need for adjusting, calibrating and segmenting points of impact for multiple times; and (3) when a shooting deviation is calibrated, there is a need for a large number of shooting adjustments, and the accuracy must be approached only under the calibration of an experienced professional shooter; however, for an ordinary shooter or a shooter being lack of a shooting experience, the deviation calibration is a very troublesome work consuming a plenty of time and a large quantity of material resources; and once the calibrated sighting system encounters a case of dismantling and replacing the sighting telescope, the above calibration process is required to be carried out again, which brings the great inconvenience to the use of a user.

SUMMARY

In view of the above-mentioned problems, the present invention provides an electro-optical sighting telescope system without manual intervention and an automatic deviation correcting method thereof from a perspective of a sighting system of a gun itself and in combination with academic research in image science and image processing.

The present invention is achieved by the following technical solution.

Provided is an automatic deviation correction method of a shooting sighting telescope capable of automatically correcting a deviation. The automatic deviation correction method includes the following steps: converting an optical image obtained by a shooting sighting telescope into an electronic image, extracting a target paper area from the electronic image, and performing pixel-level subtraction on the target paper area and an electronic reference target paper to detect points of impact, calculating a center point of each of the points of impact to obtain a deviation of the center point of each of the points of impact and a center point of the target paper area; and inputting the deviation into the shooting sighting telescope for automatically correcting subsequent shooting.

Further, performing perspective correction on the target paper area after the target paper area is extracted corrects an outer contour of the target paper area to a circular contour, and point of impact detection is performed by using the target paper area subjected to perspective correction.

Further, extracting a target paper area from the electronic image particularly comprises: performing large-scale mean filtering on the electronic image to eliminate grid interference on the target paper; segmenting the electronic image into a background and a foreground by using an adaptive Otsu threshold segmentation method according to a gray property of the electronic image; and determining a minimum contour by adopting a vector tracing method and a geometric feature of a Freeman link code according to the image segmented into the foreground and background to obtain the target paper area.

Further, performing pixel-level subtraction on the target paper area and an electronic reference target paper to detect points of impact particularly comprises: performing pixel-level subtraction on the target paper area and an electronic reference target paper to obtain a pixel difference image of the target paper area and the electronic reference target paper; wherein a pixel difference threshold of images of a previous frame and a following frame is set in the pixel difference image, and a setting result is 255 when a pixel difference exceeds the threshold, and the setting result is 0 when the pixel difference is lower than the threshold; and the pixel difference image is subjected to contour tracing to obtain a point of impact contour and a center of the contour is calculated to obtain a center point of each of the points of impact.

Further, the perspective correction particularly comprises: obtaining an edge of the target paper area by using a Canny operator, performing maximum elliptical contour fitting on the edge by using Hough transform to obtain a maximum elliptical equation, and performing straight line fitting of cross lines on the edge by using the Hough transform to obtain points of intersection with an uppermost point, a lowermost point, a rightmost point and a leftmost point of a largest circular contour, and combining the uppermost point, the lowermost point, the rightmost point and the leftmost point of the largest circular contour with four points at the same positions in a perspective transformation template to obtain a perspective transformation matrix by calculation, and performing perspective transformation on the target paper area by using the perspective transformation matrix.

Further, the electronic reference target paper is an electronic image of a blank target paper or a target paper area extracted in historical analysis.

Further, the deviation comprises a longitudinal deviation and a lateral deviation.

The present invention has the advantageous effects: the present invention provides an automatic deviation correction method which may be applied to an electro-optical sighting system. The automatic deviation correction method may calculate the shooting deviation according to historical shooting data, and performs automatic deviation correction on subsequent shooting by utilizing the historical shooting deviation without too much human experience intervention, achieves quick sighting and significantly improves the shooting accuracy.

BRIEF DESCRIPTION OF THE DRAWINGS

wherein 1. field of view acquisition unit; 2. display unit; 3. battery compartment; 4. rotary encoder; 5. focusing knob; 6. external leather track; 7. key control board; 8. Picatinny; 9. electro-optical conversion board; 10. sighting circuit processing unit; 11. display conversion board; 81. adjustable fastening nut 1; 82. adjustable fastening nut II; 101. CPU core board; and 102. interface board 102.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Example 1

The present invention further provides a shooting sighting telescope for automatic deviation correction. The sighting telescope has an automatic deviation correction module, wherein the automatic deviation correction module performs automatic correction on subsequent shooting by adopting an automatic deviation correction method in accordance with historical shooting accuracy.

The sighting system may be conveniently mounted on various types of firearms. The electro-optical sighting system includes a housing, wherein the housing is of a detachable structure as a whole, an internal portion of the housing is an accommodating space, the accommodating space includes a field of view acquisition unit, a video processing unit, a display unit, a power supply and a sighting circuit unit.

Figure 13:
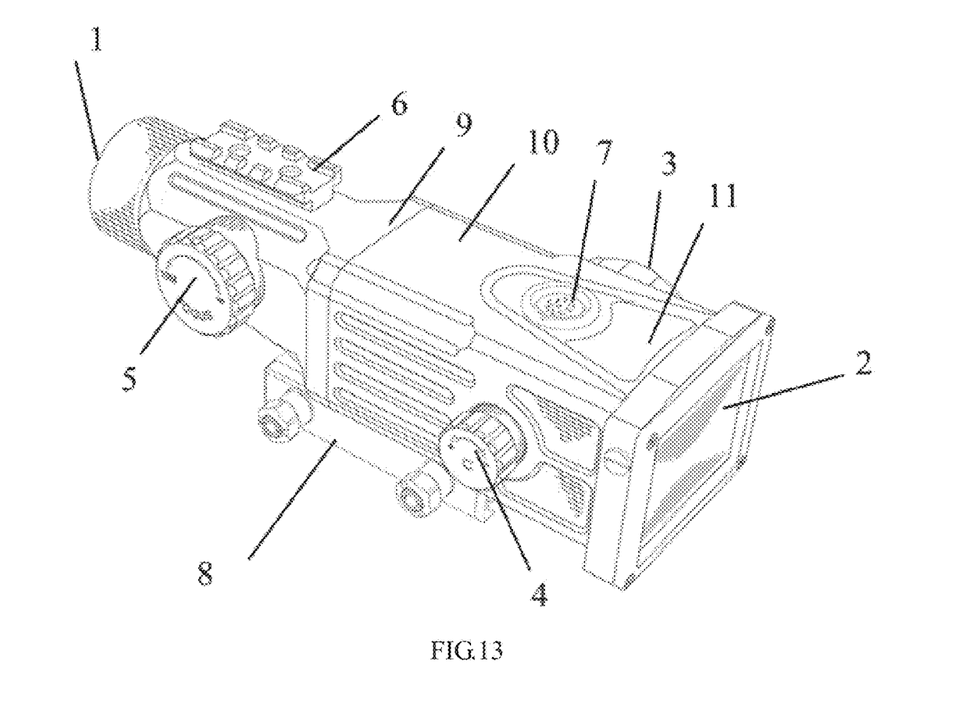
FIG. 13 is a perspective view showing a sighting telescope in an embodiment 1 according to the present invention.
Figure 14:
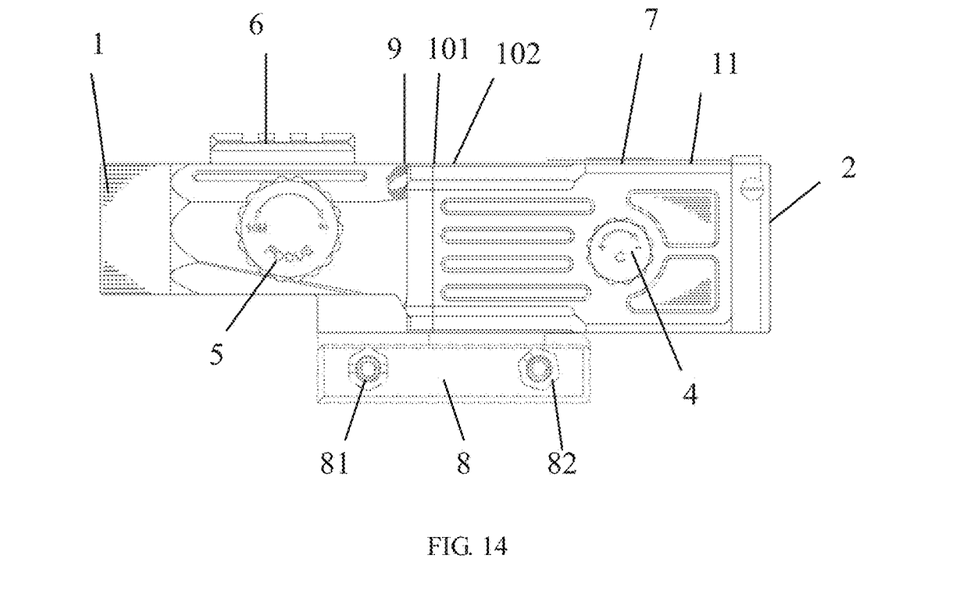
FIG. 14 is a left view showing a sighting telescope in an embodiment 1 according to the present invention.
Figure 15:
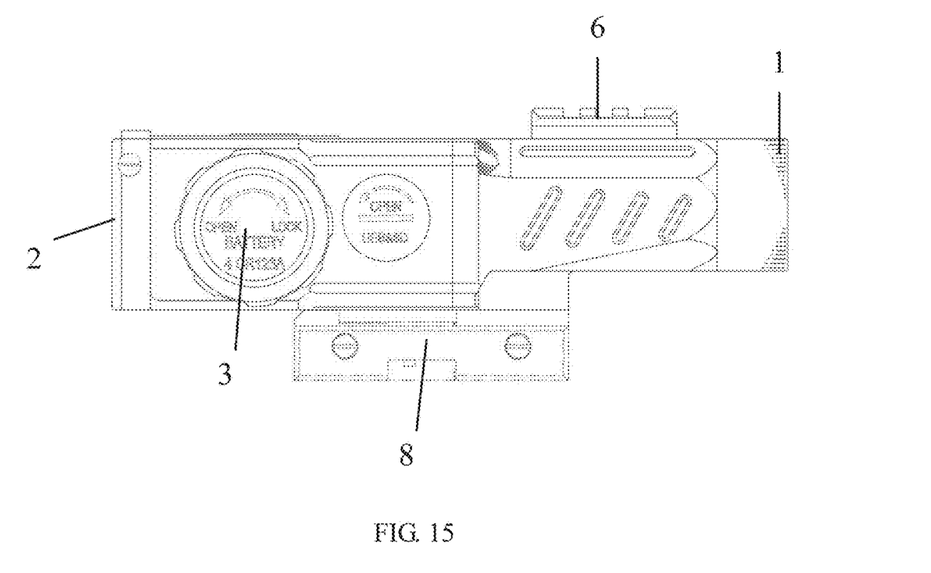
FIG. 15 is a right view showing a sighting telescope in an embodiment 1 according to the present invention.
Figure 16:
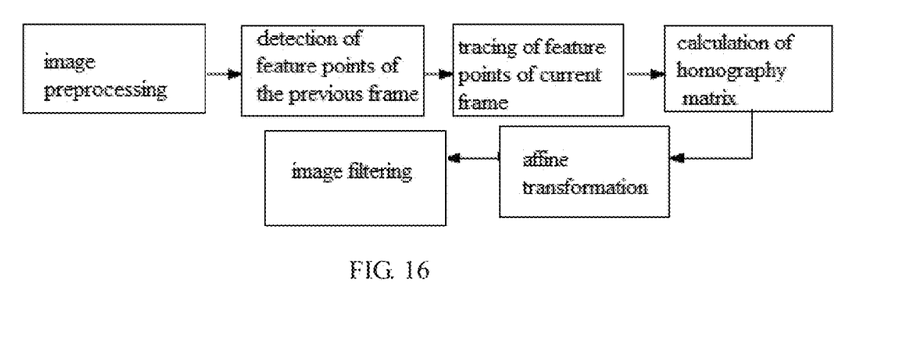
FIG. 16 is a schematic diagram of a process of a video anti jitter method in an embodiment 4 according to the present invention.

A structure of the sighting telescope is as shown in FIG. 13 to FIG. 15.

The field of view acquisition unit 1 includes an objective lens combination or other optical visual device, and the objective lens combination or the optical visual device is mounted on the front end of the field of view acquisition unit 1 to acquire field of view information.

The electro-optical sighting system is a digitallizer as a whole, which may communicate with a smart phone, an intelligent terminal, a sighting apparatus or a circuit and sends video information acquired by the field of view acquisition unit 1 to the smart phone, the intelligent terminal, the sighting apparatus or the circuit, and the video information acquired by the field of view acquisition unit 1 is displayed by the smart phone, the intelligent terminal or other apparatuses.

The field of view acquisition unit 1 includes an electro-optical conversion circuit, wherein the circuit includes an electro-optical conversion board 9 which converts a field of view optical signal into an electrical signal, the electro-optical conversion board 9 is an electro-optical conversion circuit board located in the field of view acquisition unit 1, the electro-optical conversion board 9 converts the optical signal into the electrical signal, while performing automatic exposure, automatic white balance, noise reduction and sharpening operation on the signal, so that the signal quality is improved, and high-quality data is provided for imaging.

The sighting circuit processing unit 10 for connecting the electro-optical conversion board 9 with the display conversion board 11 includes a CPU core board 101 and an interface board 102, wherein the interface board 102 is connected with the CPU core board 101, particularly, the CPU core board 101 is connected with a serial port of the interface board 102 through a serial port, the CPU core board 101 is disposed between the interface board 102 and the electro-optical conversion board 9, the three components are placed in parallel, and board surfaces are all perpendicular to the field of view acquisition unit 1, and the electro-optical conversion board 9 transmits the converted video signal to the CPU core board 102 for further processing through a parallel data interface, and the interface board 102 communicates with the CPU core board 101 through a serial port to transmit peripheral operation information such as battery power, gesture information, time, key operation and knob operation to the CPU core board 101 for further processing.

The CPU core board 101 may be connected with a memory card through the interface board 102. In the embodiment of the present invention, with the field of view acquisition unit 1 as an observation entrance direction, a memory card slot is disposed at the left side of the CPU core board 101, the memory card is inserted in the memory card slot, information may be stored in the memory card, and the memory card may automatically upgrade a software program built in the system.

With the field of view acquisition unit 1 as the observation entrance direction, a USB interface is disposed on a side of the memory card slot on the left side of the CPU core board 101, and by means of the USB interface, the system may be powered by an external power supply or information of the CPU core board 101 is output.

The electro-optical sighting system further includes a plurality of sensors, particularly, may include several or all of an acceleration sensor, a wind speed and wind direction sensor, a geomagnetic sensor, a temperature sensor, a barometric pressure sensor, and a humidity sensor.

A battery compartment 3 is disposed within the housing, a battery pack 31 is disposed within the battery compartment 3, an elastic sheet is disposed within the battery compartment 3 for fastening the battery pack, the battery compartment 3 is disposed in the middle in the housing, and a cover of the battery compartment may be opened by the side of the housing to realize replacement of the battery pack.

A line welding contact is disposed at the bottom side of the battery compartment 3, the contact is connected with the elastic sheet inside the battery compartment, the contact of the battery compartment 3 is welded with a wire with a wiring terminal, and is connected with the interface board 102 for powering the interface board 102, the CPU core board 101, the electro-optical conversion board 9, the display conversion board 11 and the display unit 2.

The display unit 2 is a display screen, the display unit 2 is connected with the interface board 102 through the display conversion board 11, thereby communicating with the CPU core board 101; and the CPU core board transmits display data to the display unit 2 for display.

Crossed segmenting lines displayed on the display screen and video information acquired by the field of view acquisition unit are superimposed on each other, the crossed segmenting lines are used to perform sighting shooting, and auxiliary shooting information and work instruction information which are used for assisting the shooting and transmitted by the sensors are also displayed on the display screen.

The auxiliary shooting information is partially applied to a shooting trajectory calculation, and partially used for displaying and reminding a user.

An external key is disposed at the top of the housing, and connected onto the interface board 102 through a key control board 11 on the inner side of the housing, and functions of turning the device on or off, photographing and video-recording may be realized by touching and pressing the external key.

With the field of view acquisition unit 1 as the observation entrance direction, a rotary encoder 4 with a key function is disposed on one side, which is close to the display unit 2, on the right side of the housing, and the rotary encoder 4 is linked with an encoder circuit board 41 inside the housing, and the encoder circuit board 41 is connected with an interface board through a flat cable with a wiring terminal to complete transmission of operation data. The rotary encoder controls functions such as function switching, distance magnification data adjustment, information setting and deviation data entering.

With the field of view acquisition unit 1 as the observation entrance direction, a focusing knob 5 is disposed at one side, which is close to the field of view acquisition unit 1, on the right side of the housing, and the focusing knob 5 adjusts focusing of the field of view acquisition unit 1 by a spring mechanism, so as to achieve the purpose of clearly observing an object under different distances and different magnifications.

A Picatinny 8 is disposed at the bottom of the housing and used for being fixed on a shooting instrument, and the Picatinny includes adjustable fastening nuts 81 and 82, which are located on the left side or right side of the Picatinny.

An external leather track 6 is disposed at the top of the field of view acquisition unit 1 of the housing, and the external leather track 6 and the field of view acquisition unit 1 are designed with the same optical axis and fastened by screws. The external leather track 6 is designed in a standard size and may be provided with an object fixedly provided with a standard Picatinny connector, and the object includes a laser range finder, a fill light, a laser pen, and the like.

The present embodiment further provides an automatic deviation correction method, including the following steps:

(1) Electro-optical conversion, namely, converting an optical image obtained by the shooting sighting telescope into an electronic image.

(2) Target paper area extraction, namely, extracting a target paper area from the electronic image.

A target paper area of interest is extracted from a global image, and the interference of complex background environment information is eliminated. The target paper area extraction method is a target detection method based on adaptive threshold segmentation. The detection method is high in speed of determining the threshold, and better in performance for a variety of complex conditions, and guarantees the segmentation quality. The detection method sets t as a segmentation threshold of the foreground and the background by employing an idea of maximizing an inter-class variance, wherein a ratio of the number of foreground points to the image is w0, an average gray value is u0; and a ratio of the number of background points to the image is w1, an average gray value is u1, and u is set as the total average gray value of the image, then:

$$u=w0*u0+w1*u1;$$

t is traversed from the minimum gray level value to the maximum gray level value, when a value of t lets a value of to be maximum, t is an optimal segmentation threshold;

$$g=w0*(u0-u)^2+w1*(u1-u)^2.$$

Figure 4:
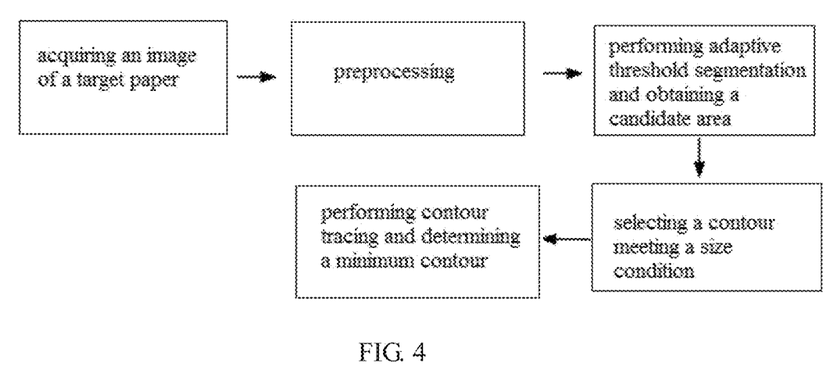
FIG. 4 is a block diagram of a process for extracting a target paper area according to the present invention.

A process for executing the target paper extraction method is as shown in FIG. 4. The target paper extraction method includes four steps, namely, image mean filtering, determination of the segmentation threshold by using an Otsu threshold method, determination of a candidate area by threshold segmentation, determination and truncation of the minimum contour by using a contour tracing algorithm.

(21) Image Mean Filtering.

The image is subjected to large-scale mean filtering to eliminate grid interference on a target paper, highlighting a circular target paper area. By taking a sample with a size 41*41 as an example, a calculation method is as follows:

$$g(x, y) = \frac{1}{41*41} \sum_{i=-20}^{i=20} \sum_{j=-20}^{j=20} \text{origin}(x+i, y+j);$$

wherein g(x,y) represents a filtered image, x represents a horizontal coordinate of a center point of a sample on a corresponding point on the image, y represents a longitudinal coordinate of the center point of the sample on the corresponding point on the image, i represents a pixel point horizontal coordinate index value between −20 and 20 relative to x, and j represents a pixel point longitudinal coordinate index value between −20 and 20 relative to y.

(22) Determination of the Segmentation Threshold by Using an Otsu Threshold Method.

Threshold segmentation segments the image into the background and the foreground by using the adaptive Otsu threshold segmentation (OTSU) method according to a gray property of the image. The greater a variance between the background and the foreground is, the greater the difference between the two parts of the image is. Therefore, for the image I(x,y), the segmentation threshold of the foreground and the background is set as Th, a ratio of pixel points belonging to the foreground to the whole image is w2, and its average gray level is G1; a ratio of pixel points belonging to the background to the whole image is w3, and its average gray level is G2, the total average gray level of the image is G_Ave, an interclass variance is g, a size of the image is M*N, in the image, the number of pixels with gray level values smaller than the threshold is denoted as N1, and the number of pixels with gray level values greater than the threshold is denoted as N2, then $$w2 = \frac{N1}{M*N};$$

$$w3 = \frac{N2}{M*N};$$

$$M*N = N1 + N2;$$

$$w2 + w3 = 1;$$

$$G\_Ave = w2*G1 + w3*G2;$$

$$g = w2*(G\_Ave - G1)^2 + w3*(G\_Ave - G2)^2;$$

the resultant equivalence formula is as follows:

$$g = w2*w3*(G1-G2)^2;$$

the segmentation threshold th when the interclass variance g is maximum may be obtained by employing a traversing method.

(23) Segmentation of the Filtered Image in Combination with the Determined Segmentation Threshold Th.

$$g(x, y) = \begin{cases} 255, & \text{Input}(x, y) \geq Th \\ 0, & \text{Input}(x, y) < Th \end{cases};$$

a binary image segmented into the foreground and the background is obtained.

(24) Determination and Truncation of the Minimum Contour by Employing a Contour Tracing Algorithm.

Contour tracing employs a vector tracing method of a Freeman chain code, which is a method for describing a curve or boundary by using coordinates of a starting point of the curve and direction codes of boundary points. The method is a coded representation method of a boundary, which uses a direction of the boundary as a coding basis. In order to simplify the description of the boundary, a method for describing a boundary point set is employed.

Figure 1:
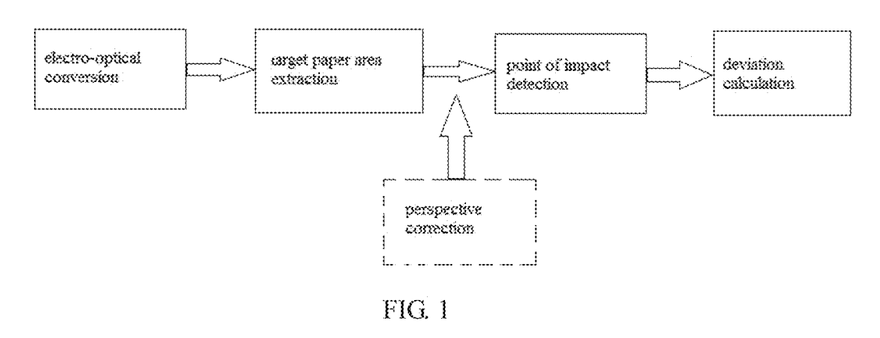
FIG. 1 is a block diagram of a flow of an automatic deviation correction method according to the present invention.
Figure 2:
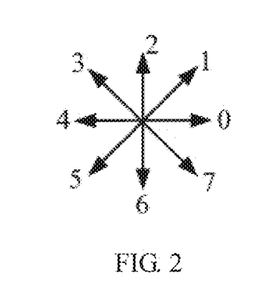
FIG. 2 is a 8-connected chain code in an embodiment 1 according to the present invention.

Commonly used chain codes are divided into a 4-connected chain code and a 8-connected chain code according to the number of adjacent directions of a center pixel point. The 4-connected chain code has four adjacent points, respectively in the upper side, the lower side, the left side and the right side of the center point. The 8-connected chain code increases 4 inclined 45° directions compared with the 4-connected chain code, because there are eight adjacent points around any one pixel, and the 8-connected chain code just coincides with an actual situation of the pixel points, information of the center pixel point and its adjacent points may be accurately described. Accordingly, this algorithm employs the 8-connected chain code, as shown in FIG. 2.

A 8-connected chain code distribution table is as shown in Table 1:

TABLE 1

| 8-connected chain code distribution table | | |
|---|---|---|
| 3 | 2 | 1 |
| 4 | P | 0 |
| 5 | 6 | 7 |

Figure 3:
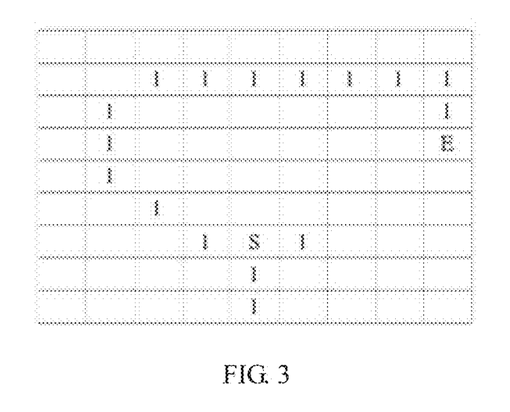
FIG. 3 is a bitmap in an embodiment 1 according to the present invention.

As shown in FIG. 3, a 9×9 bitmap is given, wherein a line segment with a starting point S and an end point E may be represented as L=43322100000066.

A FreemanList structure is customized in combination with a custom structure body:

```
{
int x;
int y;
int type;
FreemanList* next;
}
``` whether the head and the tail of a chain code structure are consistent or not is determined, so that whether the contour is complete or not is determined.

An image of the target paper area is obtained and then stored.

(3) Detecting Points of Impact.

The point of impact detection method is a background subtraction-based point of impact detection method. The method includes: detecting points of impact from the image of the target paper area, and determining a position of a center point of each of the points of impact. This method stores the previous target surface pattern, and then uses the current target surface pattern for pixel-level subtraction with the previous target surface pattern. Since images of two frames may have a pixel deviation during the perspective correction calculation of the image, a downsampling method is employed to count an area with 2 pixels as a step length, wherein the area is obtained by calculating the downsampled gray level map with the minimum gray level value as the pixel gray level value within a 2*2 pixel area, with a gray level greater than 0; and this area is subjected to contour detection to obtain information of newly generated points of impact pattern.

The point of impact detection method is high in processing speed when comparison is performed by utilizing pixel-level subtraction of the images of the previous frame and the following frames, and can ensure that positions of the newly generated points of impact are returned. The point of impact detection method is performed as follows.

(31) Storing an Original Target Paper Image

Data of the original target image is stored and read in a cache to enable the original target image to serve as a reference target paper image. If a target subjected to accuracy calculation is shot again during shooting, the target paper area stored at the time of the last accuracy calculation is used as a reference target paper image.

(32) Performing Pixel-Level Subtraction on the Image Subjected to the Processing of the Steps (1) to (2) and the Original Target Paper Image to Obtain a Difference Position.

The pixel difference threshold of the images of the previous frame and the following frame is set. A setting result is 255 when a pixel difference exceeds the threshold, and the setting result is 0 when the pixel difference is lower than the threshold.

$$\text{result}(x, y) = \begin{cases} 255, \text{grayPre}(x, y)\_\text{grayCur}(x, y) \geq \text{threshold} \\ 0, \text{grayPre}(x, y)\_\text{grayCur}(x, y) < \text{threshold} \end{cases};$$

a specific threshold may be obtained through debugging, with a set range generally between 100 and 160.

(33) Performing Contour Tracing on the Image Generated in the Step (32) to Obtain a Point of Impact Contour and Calculating a Center Point of Each of the Points of Impact.

Contour tracing is performed by a Freeman chain code to calculate an average to obtain the center point of each of the points of impact, and its calculation formula is as follows:

$$\text{Centerx}_i = \frac{1}{n} \sum_{i \in \text{FreemanList}} \text{FreemanList}_i \cdot x;$$

$$\text{Centery}_i = \frac{1}{n} \sum_{i \in \text{FreemanList}} \text{FreemanList}_i \cdot y;$$

$\text{Centerx}_i$ represents a center x-axis coordinate of an i-th point of impact, $\text{Centery}_i$ represents a center y-axis coordinate of the i-th point of impact, $\text{Freemanlist}_i$ represents a contour of the i-th point of impact; and n is a positive integer.

Figure 12:
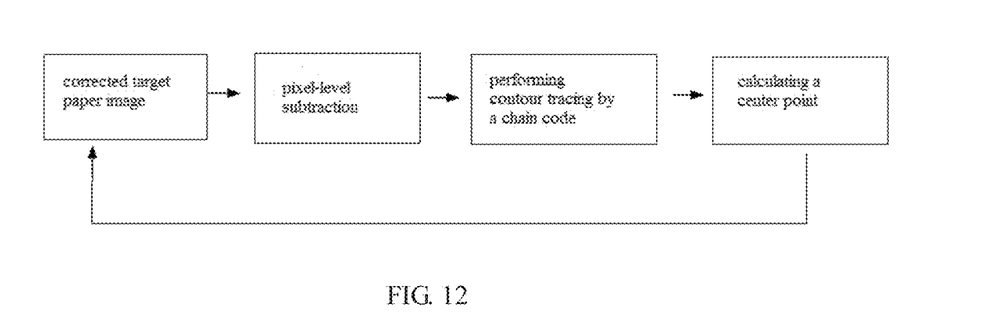
FIG. 12 is a block diagram of a process for performing a point of impact detection method according to the present invention.

A process for performing the point of impact detection method is as shown in FIG. 12.

(4) Calculating a Deviation.

A horizontal deviation and a longitudinal deviation between each of the points of impact and a center of the target paper are detected to obtain a deviation set.

Pixel-level subtraction is performed on the target paper area and the electronic reference target paper to detect the points of impact, and the center point of each of the points of impact is calculated, the shooting accuracy is determined according to the deviation between the center point of each of the points of impact and the center point of the target paper area, and the deviation is input to the shooting sighting telescope for automatically correcting subsequent shooting.

Embodiment 2

This embodiment is substantially the same as the embodiment 1, with a difference lying in including a target paper area correction step after the target paper area is extracted.

Target Paper Area Correction.

Due to the pasting of the target paper as well as an angular deviation between the spotting scope and the target paper when the image is acquired, an effective area of the extracted target paper may be tilted so that the acquired image is non-circular. In order to ensure that the calculated deviation value of each of the points of impact is higher in accuracy, perspective correction is performed on the target paper image to correct the outer contour of the target paper into a regularly circular contour. The target paper area correction method is a target paper image correction method based on an elliptical end point, and the method obtains the edge of the image by using a Canny operator. Since the target paper image almost occupies the whole image, maximum elliptical contour fitting is performed by using Hough transform in the case of small parameter change range to obtain the maximum elliptic equation. There are cross lines in the target paper image, and a number of points of intersection with the ellipse, and these points of intersection correspond to the uppermost point, the lowermost point, the rightmost point and the leftmost point of the largest circular contour in a standard graph, respectively. Straight line fitting of the cross lines is performed by using Hough transform. In an input sub-image, an intersection point set of the cross lines and the ellipse is obtained, and a perspective transformation matrix is calculated in combination with a point set of the same positions of the template.

The target paper area correction method may quickly obtain an outermost ellipse contour parameter by using the Hough transform. Meanwhile, a Hough transform straight line detection algorithm under polar coordinates can quickly obtain a straight line parameter as well, so that the method can quickly correct the target paper area.

The target paper area correction method is performed as follows.

(51) Performing Edge Detection by Using a Canny Operator.

The method includes five parts of conversion of RGB into a gray level map, Gaussian filtering to suppress noise, first-order derivative calculation of a gradient, non-maximum suppression, detection and connection of the edge by a double-threshold method.

Conversion of RGB into a Gray Level Map

Gray level conversion is performed by a conversion ratio of RGB into a gray level to convert a RGB image into a gray level map (three-primary colors of R, G and B are converted to gray level values), and its process is performed as follows:

$$\text{Gray} = 0.299R + 0.587G + 0.114B$$

Gaussian Filtering of the Image.

Gaussian filtering is performed on the converted gray level map to suppress noise of the converted image, $\sigma$ is set as a standard deviation, at this time, a size of the template is set as $(3*\sigma+1)*(3\sigma+1)$ according to a Gaussian loss minimization principle, x is set as a horizontal coordinate deviating from the center point of the template, y is set as a longitudinal coordinate deviating from the center point of the template, and K is set as a weight value of a Gaussian filtering template, and its process is performed as follows:

$$K = \frac{1}{2\pi\sigma*\sigma} e^{-\frac{x*x+y*y}{2\sigma*\sigma}}$$

Calculation of a gradient magnitude and a gradient direction by using a finite difference of first-order partial derivative.

A Convolution Operator:

$$S_x = \begin{bmatrix} -1 & 1 \\ -1 & 1 \end{bmatrix};$$

$$S_y = \begin{bmatrix} 1 & 1 \\ -1 & -1 \end{bmatrix};$$

the gradient is calculated as follows:

$$P[i,j] = (f[i,j+1] - f[i,j] + f[i+1,j+1] - f[i+1,j])/2;$$

$Q[i,j]=(f[i,j]-f[i+1,j]+f[i,j+1]-f[i+1,j+1])/2;$ $M[i,j]=\sqrt{P[i,j]^2 Q[i,j]^2};$ $?[i,j]=\tan^{-1}(Q[i,j]/P[i,j]);$ Non-Maximum Suppression.

Figure 5:
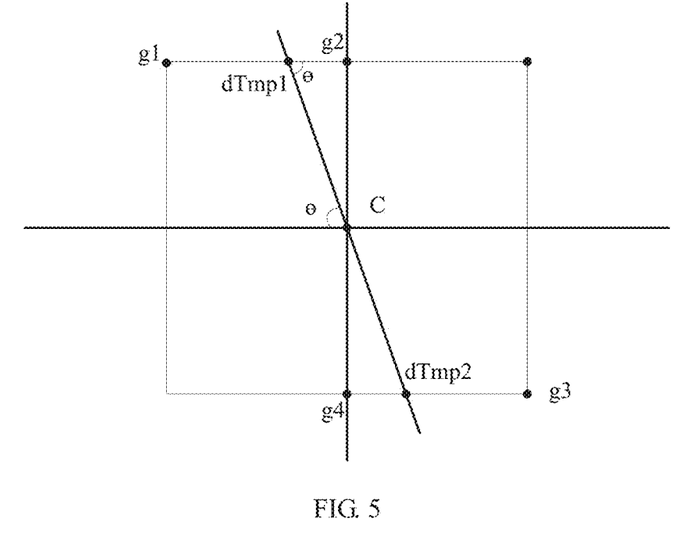
FIG. 5 is a schematic diagram of non-maximum suppression in an embodiment 2 according to the present invention.
Figure 6:
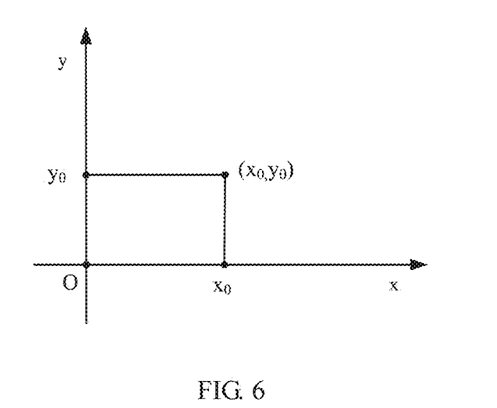
FIG. 6 is a schematic diagram of transformation of an original point under a Caresian coordinate system in an embodiment 2 according to the present invention.

The method is to find the local maximum of the pixel point, the gray level value corresponding to a non-maximum point is set to 0, so that most of non-marginal points are eliminated.

It may be known from FIG. 5, it is necessary to determine whether the gray level value of the pixel point C is maximum within its 8-valued neighborhood when non-maximum suppression is performed. In FIG. 5, a direction of a line dTmp1dTmp2 in FIG. 5 is a gradient direction of the point C, in this way, it may be determined that its local maximum value is definitely distributed on this line, that is, in addition to the point C, values of the two points of intersection dtmp1 and dTmp2 in the gradient direction will be local maximums. Therefore, determining the gray level value of the point C and the gray level values of these two points may determine whether the point C is a local maximum gray point within its neighborhood. If the gray level value of the point C is less than any of these two points, then the point C is not the local maximum, and it may be excluded that the point C is an edge.

Detection and Connection of the Edge by Adopting a Double-Threshold Algorithm.

A double-threshold method is used to further reduce the number of non-edges. A low threshold parameter Lthreshold and a high threshold parameter Hthreshold are set, and the two constitute a comparison condition, the high threshold and numerical values above the high threshold are converted into 255 values for storage, numerical values between the low threshold and the high value are uniformly converted into 128 values for storage, and other values are considered as non-edge data and replaced by 0.

$$g(x, y) = \begin{cases} 0, & g(x, y) \leq Lthreshold \\ 255, & g(x, y) \geq Hthreshold \\ 128, & Lthreshold < g(x, y) < Hthreshold \end{cases};$$

edge tracing is performed by utilizing the Freeman chain code again to filter out edge points with small length.

(52) Fitting the Cross Lines by Using the Hough Transform Under the Polar Coordinates to Obtain a Linear Equation.

The Hough transform is a method for detecting a simple geometric shape of a straight line and a circle in image processing. One straight line may be represented as y=kx+b by using a Caresian coordinate system, then any one point (x,y) on the straight line is converted into a point in a k-b space, in other words, all non-zero pixels on the straight line in an image space are converted into a point in the k-b parameter space. Accordingly, one local peak point in the parameter space may correspond to one straight line in an original image space. Since a slope has an infinite value or an infinitesimal value, the straight line is detected by using a polar coordinate space. In a polar coordinate system, the straight line can be represented as follows:

$\rho=x^*\cos\theta+y^*\sin\theta$

Figure 7:
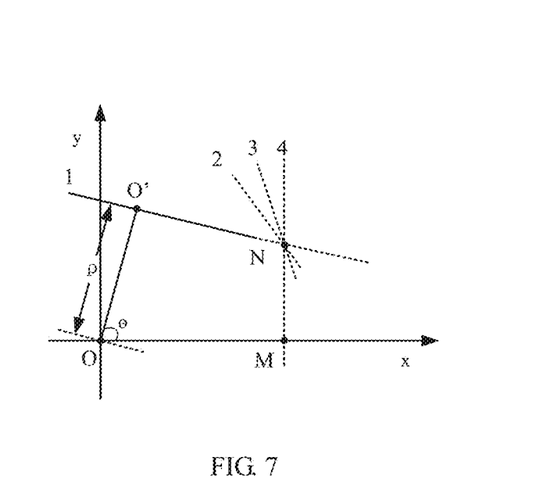
FIG. 7 is a schematic diagram showing any four straight lines passing through an original point under a Caresian coordinate system in an embodiment 2 according to the present invention.
Figure 8:
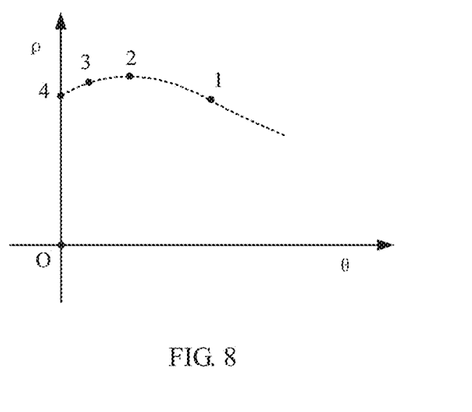
FIG. 8 is a schematic diagram of expression of any four straight lines passing through an original point under a polar coordinate system in a Caresian coordinate system in an embodiment 2 according to the present invention.

It may be known from the above formula in combination with FIG. 7, a parameter ρ represents a distance from an origin of coordinates to the straight line, each set of parameters ρ and θ will uniquely determine one straight line, and only if the local maximum value serves as a search condition in the parameter space, a straight line parameter set corresponding to the local maximum may be acquired.

After the corresponding straight line parameter set is obtained, the non-maximum suppression is used to reserve a parameter of the maximum.

(53) Calculating Four Points of Intersection of the Cross Lines with the Ellipse.

Figure 9:
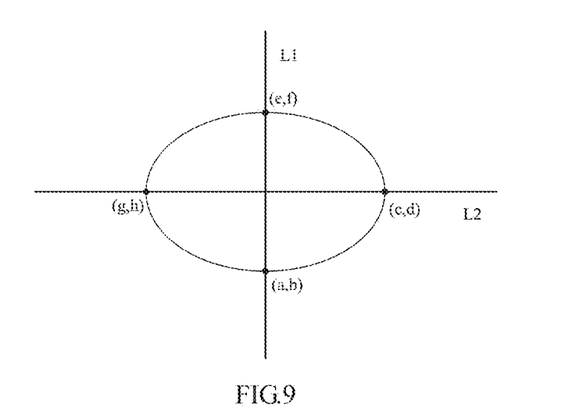
FIG. 9 is a schematic diagram of determining points of intersection of cross lines L1 and L2 with an ellipse in an embodiment 2 according to the present invention.

L1 and L2 linear equations are known, as long as points of intersection with an outer contour of the ellipse are searched in a straight line direction to obtain four intersection point coordinates (a,b), (c,d), (e,f), (g,h), as shown in FIG. 9.

(54) Calculating a Perspective Transformation Matrix Parameter for Image Correction.

The four points of intersection are used to form four point pairs with coordinates of four points defined by the template, and the target paper area is subjected to perspective correction.

Figure 10:
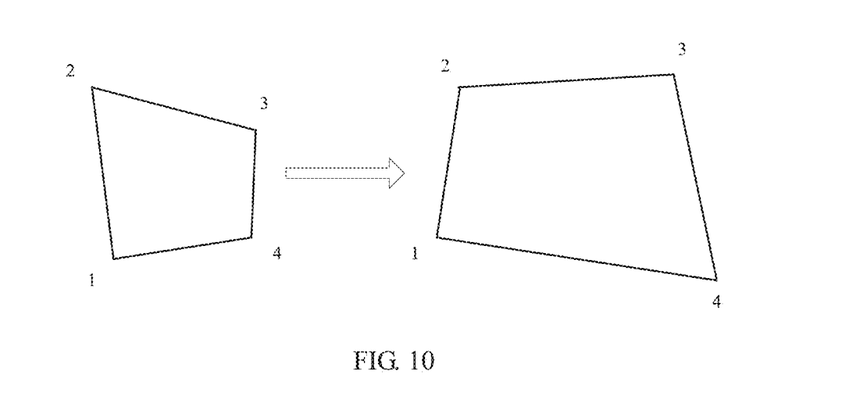
FIG. 10 is a schematic diagram of a perspective transformation diagram in an embodiment 2 according to the present invention.
Figure 11:
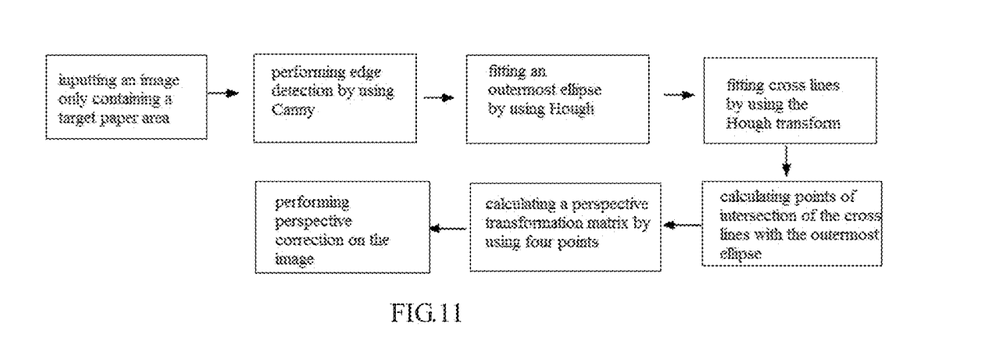
FIG. 11 is a block diagram of a process for performing target paper area correction according to the present invention.

The perspective transformation is to project the image to a new visual plane, and a general transformation formula is as follows:

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix}$$

u and v are coordinates of an original image, corresponding to coordinates x' and y' of the transformed image. In order to construct a three-dimensional matrix, auxiliary factors w, w' are added, w is taken as 1, and w' is a value of the transformed w, wherein $x'=x/w;$ $y'=y/w;$ the above formulas may be equivalent to:

$$x' = \frac{x}{w} = \frac{a_{11}*u + a_{12}*v + a_{31}}{a_{13}*u + a_{23}*v + a_{33}};$$

$$y' = \frac{y}{w} = \frac{a_{12}*u + a_{22}*v + a_{32}}{a_{13}*u + a_{23}*v + a_{33}};$$

accordingly, the perspective transformation matrix can be obtained by giving the coordinates of the four points corresponding to the perspective transformation. After the perspective transformation matrix is obtained, the image or the pixel point may be subjected to perspective transformation. As shown in FIG. 10:

in order to facilitate the calculation, we have simplified the above formula, $(a_1, a_2, a_3, a_4, a_5, a_6, a_7, a_8)$ is set as 8 parameters of the perspective transformation, and the above formulas are equivalent to:

$$x' = \frac{a_1*x + a_2*y + a_3}{a_7*x + a_8*y + 1};$$

$$y' = \frac{a_4*x + a_5*y + a_6}{a_7*x + a_8*y + 1};$$

wherein (xy) represents a to-be-calibrated map coordinate, (x',y') represents a calibrated map coordinate, that is, a template map coordinate. The above formulas are equivalent to:

$$a_1 *x + a_2 *y + a_3 - a_7 *x*x' - a_8 *y*x' - x' = 0;$$

$$a_4 *x + a_5 *y + a_6 - a_7 *x*y' - a_8 *y*y' - y' = 0;$$

the above formulas are converted into a matrix form:

$$\begin{bmatrix} x & y & 1 & 0 & 0 & 0 & -xx' & -yx' \\ 0 & 0 & 0 & x & y & 1 & -xy' & -yy' \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x' \\ y' \end{bmatrix};$$

since there are 8 parameters, one point has two equation pairs, so that) only 4 points can solve the corresponding 8 parameters. $(x_i, y_i)$ is set as a coordinate of a pixel point of a to-be-calibrated image, $(x_i', y_i')$ is set as a coordinate of a pixel point of a template map, i={1, 2, 3, 4}. Accordingly, the matrix form may be converted into:

$$\begin{bmatrix} x_1 & y_1 & 1 & 0 & 0 & 0 & -x_1 x_1' & -y_1 x_1' \\ 0 & 0 & 0 & x_1 & y_1 & 1 & -x_1 y_1' & -y_1 y_1' \\ x_2 & y_2 & 1 & 0 & 0 & 0 & -x_2 x_2' & -y_2 x_2' \\ 0 & 0 & 0 & x_2 & y_2 & 1 & -x_2 y_2' & -y_2 y_2' \\ x_3 & y_3 & 1 & 0 & 0 & 0 & -x_3 x_3' & -y_3 x_3' \\ 0 & 0 & 0 & x_3 & y_3 & 1 & -x_3 y_3' & -y_3 y_3' \\ x_4 & y_4 & 1 & 0 & 0 & 0 & -x_4 x_4' & -y_4 x_4' \\ 0 & 0 & 0 & x_4 & y_4 & 1 & -x_4 y_4' & -y_4 y_4' \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x_1' \\ y_1' \\ x_2' \\ y_2' \\ x_3' \\ y_3' \\ x_4' \\ y_4' \end{bmatrix};$$

let $$A = \begin{bmatrix} x_1 & y_1 & 1 & 0 & 0 & 0 & -x_1 x_1' & -y_1 x_1' \\ 0 & 0 & 0 & x_1 & y_1 & 1 & -x_1 y_1' & -y_1 y_1' \\ x_2 & y_2 & 1 & 0 & 0 & 0 & -x_2 x_2' & -y_2 x_2' \\ 0 & 0 & 0 & x_2 & y_2 & 1 & -x_2 y_2' & -y_2 y_2' \\ x_3 & y_3 & 1 & 0 & 0 & 0 & -x_3 x_3' & -y_3 x_3' \\ 0 & 0 & 0 & x_3 & y_3 & 1 & -x_3 y_3' & -y_3 y_3' \\ x_4 & y_4 & 1 & 0 & 0 & 0 & -x_4 x_4' & -y_4 x_4' \\ 0 & 0 & 0 & x_4 & y_4 & 1 & -x_4 y_4' & -y_4 y_4' \end{bmatrix};$$

$$X = \begin{bmatrix} a_1 \\ a_2 \\ a_3 \\ a_4 \\ a_5 \\ a_6 \\ a_7 \\ a_8 \end{bmatrix};$$

$$b = \begin{bmatrix} x_1' \\ y_1' \\ x_2' \\ y_2' \\ x_3' \\ y_3' \\ x_4' \\ y_4' \end{bmatrix};$$

the above formula is as follows:

$$AX = b$$

a nonhomogeneous equation is solved to obtain a solution:

$$X = A^{-1} b$$

the corrected target paper area is obtained and then stored, and the image of the corrected target paper area is applied at the time of subsequent ballistic point detection.

Example 3

This embodiment is basically the same as the embodiment 1 except that in order to improve the display quality of video, the electro-optical sighting system of the embodiment is additionally provide with a video anti jitter processing unit on a CPU core board, a video anti jitter processing method included by the video anti-jitter processing unit performs pre-processing, feature point detection, feature point tracing, homography matrix calculation, image filtering and affine transformation on the acquired image data, and the image subjected to a series of processing can be displayed smoothly. A flow diagram of the video anti jitter processing method is as shown in FIG. 15.

The video anti jitter processing method includes detection of feature points of the previous frame, tracing of feature points of a current frame, homography matrix calculation, image filtering and affine transformation; the detection of feature points of the previous frame uses extraction of the feature points by using a FAST corner detection method as a template of performing feature point tracing by the data of the following frame, the current frame employs a pyramid Lucas-Kanade optical flow method for performing feature point tracing on the previous frame, two feature points with excellent properties are selected from all feature points by using a RANSAC algorithm, it is assumed that the feature points only have rotation and translation, the affine transformation of a homography matrix is rigid body transformation, and a translation distance and a rotation angle are calculated from two sets of points to calculate the homography matrix of the affine transformation, subsequently, a Kalman filter is used to perform a filtering operation on a transformation matrix, so as to eliminate random motion components; and finally coordinates of the original image and the filtered transformation matrix are multiplied so that coordinates of the original coordinates in a new image may be obtained, so that the affine transformation is achieved and the video jitter is eliminated.

In addition, for non-RGB formats of images acquired by some models of sights, there is a need for performing a preprocessing operation on image information to convert it into a RGB format before the feature point of the previous frame is detected, so that the image information is simplified, and then provided to the subsequent image processing module.

What is claimed is:

1. An automatic deviation correction method, which is applied to a shooting sighting telescope, the shooting sighting telescope sights a target object to acquire an optical image of the target object, characterized by comprising the following steps:
   converting an optical image obtained by a shooting sighting telescope into an electronic image;
   extracting a target paper area from the electronic image;
   performing pixel-level subtraction on the target paper area and an electronic reference target paper to detect points of impact;
   calculating a center point of each of the points of impact to obtain a deviation of the center point of each of the points of impact and a center point of the target paper area; and
   inputting the deviation into the shooting sighting telescope for automatically correcting subsequent shooting,
   wherein performing perspective correction on the target paper area after the target paper area is extracted corrects an outer contour of the target paper area to a circular contour, and point of impact detection is performed by using the target paper area subjected to perspective correction.

2. The automatic deviation correction method according to claim 1, wherein the perspective correction comprises:
   obtaining an edge of the target paper area by using a Canny operator, performing maximum elliptical contour fitting on the edge by using Hough transform to obtain a maximum elliptical equation;
   performing straight line fitting of cross lines on the edge by using the Hough transform to obtain points of intersection with an uppermost point, a lowermost point, a rightmost point and a leftmost point of a largest circular contour;
   combining the uppermost point, the lowermost point, the rightmost point and the leftmost point of the largest circular contour with four points at the same positions in a perspective transformation template to obtain a perspective transformation matrix by calculation; and
   performing perspective transformation on the target paper area by using the perspective transformation matrix.

3. The automatic deviation correction method according to claim 1, wherein the electronic reference target paper is an electronic image of a blank target paper or a target paper area extracted in historical analysis.

4. The automatic deviation correction method according to claim 1, wherein the deviation comprises a longitudinal deviation and a lateral deviation.

5. The automatic deviation correction method according to claim 1, wherein the electro-optical sighting system comprises a housing; and
   wherein an interior portion of the housing is an accommodating space, the accommodating space has a field of view acquisition unit, a video processing unit, a display unit, a power supply and a sighting circuit unit; and the electro-optical sighting system has an automatic target point tracing module.

6. The automatic deviation correction method according to claim 5,
   wherein the shooting sighting telescope has an automatic deviation correction module, and the automatic deviation correction method automatically corrects a deviation of the shooting sighting telescope.

7. The automatic deviation correction method according to claim 5, wherein the shooting sighting telescope comprises an anti-jitter processing unit; and wherein the anti-jitter processing unit performs anti-jitter processing on the electronic image to eliminate jitter and display it on the display unit.

8. An automatic deviation correction method, which is applied to a shooting sighting telescope, the shooting sighting telescope sights a target object to acquire an optical image of the target object, characterized by comprising the following steps:
   converting an optical image obtained by a shooting sighting telescope into an electronic image;
   extracting a target paper area from the electronic image;
   performing pixel-level subtraction on the target paper area and an electronic reference target paper to detect points of impact;
   calculating a center point of each of the points of impact to obtain a deviation of the center point of each of the points of impact and a center point of the target paper area; and
   inputting the deviation into the shooting sighting telescope for automatically correcting subsequent shooting, wherein the extracting the target paper area from the electronic image particularly comprises:
      performing large-scale mean filtering on the electronic image to eliminate grid interference on the target paper;
      segmenting the electronic image into a background and a foreground by using an adaptive Otsu threshold segmentation method according to a gray property of the electronic image; and
      determining a minimum contour by adopting a vector tracing method and a geometric feature of a Freeman link code according to the image segmented into the foreground and background to obtain the target paper area.

9. An automatic deviation correction method, which is applied to a shooting sighting telescope, the shooting sighting telescope sights a target object to acquire an optical image of the target object, characterized by comprising the following steps:
   converting an optical image obtained by a shooting sighting telescope into an electronic image;
   extracting a target paper area from the electronic image;
   performing pixel-level subtraction on the target paper area and an electronic reference target paper to detect points of impact;
   calculating a center point of each of the points of impact to obtain a deviation of the center point of each of the points of impact and a center point of the target paper area; and
   inputting the deviation into the shooting sighting telescope for automatically correcting subsequent shooting,
   wherein the performing pixel-level subtraction on the target paper area and the electronic reference target paper to detect points of impact comprises: performing pixel-level subtraction on the target paper area and the electronic reference target paper to obtain a pixel difference image of the target paper area and the electronic reference target paper; and
   wherein a pixel difference threshold of images of a previous frame and a following frame is set in the pixel difference image, and a setting result is 255 when a pixel difference exceeds the threshold, and the setting result is 0 when the pixel difference is lower than the threshold; and the pixel difference image is subjected to contour tracing to obtain a point of impact contour and a center of the contour is calculated to obtain a center point of each of the points of impact.

\* \* \* \* \*